United States Patent
Iio et al.

(10) Patent No.: US 12,479,171 B2
(45) Date of Patent: Nov. 25, 2025

(54) FIBER-REINFORCED RESIN HOLLOW MOLDED BODY AND METHOD FOR PRODUCING SAME

(71) Applicant: KURASHIKI BOSEKI KABUSHIKI KAISHA, Kurashiki (JP)

(72) Inventors: Hayato Iio, Osaka (JP); Naoya Takano, Osaka (JP); Yoichi Hiraishi, Osaka (JP); Tadaharu Tanaka, Osaka (JP); Yuta Nakame, Osaka (JP); Yuki Komai, Osaka (JP)

(73) Assignee: Kurashiki Boseki Kabushiki Kaisha, Okayama (JP)

( * ) Notice: Subject to any disclaimer, the term of this patent is extended or adjusted under 35 U.S.C. 154(b) by 691 days.

(21) Appl. No.: 17/786,907

(22) PCT Filed: Dec. 8, 2020

(86) PCT No.: PCT/JP2020/045616
§ 371 (c)(1),
(2) Date: Jun. 17, 2022

(87) PCT Pub. No.: WO2021/124977
PCT Pub. Date: Jun. 24, 2021

(65) Prior Publication Data
US 2023/0021569 A1 Jan. 26, 2023

(30) Foreign Application Priority Data
Dec. 19, 2019 (JP) .................................. 2019-229732

(51) Int. Cl.
*B29C 70/34* (2006.01)
*B29C 70/20* (2006.01)
(Continued)

(52) U.S. Cl.
CPC .......... *B29C 70/342* (2013.01); *B29C 70/205* (2013.01); *B29C 70/545* (2013.01);
(Continued)

(58) Field of Classification Search
None
See application file for complete search history.

(56) References Cited

U.S. PATENT DOCUMENTS 6,270,426 B1    8/2001  Matsumoto
6,565,793 B1 *  5/2003  Goldsworthy ........ B29C 70/446
                                                      264/516
(Continued)

FOREIGN PATENT DOCUMENTS

CN    107073754    8/2017
EP    1 145 841    10/2001
(Continued)

OTHER PUBLICATIONS

Extended European Search Report issued in European Patent Application No. 20902026.2, Nov. 28, 2023, 9 pages.
(Continued)

*Primary Examiner* — Yan Lan
(74) *Attorney, Agent, or Firm* — HSML P.C.

(57) ABSTRACT

A fiber reinforced resin hollow molded body 30 in which a resin-integrated fiber sheet is used. The resin-integrated fiber sheet includes unidirectional continuous fibers that are spread fibers of a continuous fiber group and arrayed unidirectionally in parallel, and thermoplastic resin that is present at least on a surface of the unidirectional continuous fibers. In the hollow molded body, in a state where the resin-integrated fiber sheet or a plurality of the resin-integrated fiber sheets 30 are stacked, the resin-integrated fiber sheet or the plurality of resin-integrated fiber sheets are wound to produce a wound body having an overlapping (Continued)

portion. The thermoplastic resin is impregnated in the unidirectional continuous fibers. The resin-integrated fiber sheet or the plurality of resin-integrated fiber sheets are consolidated.

7 Claims, 9 Drawing Sheets

(51) Int. Cl.
    *B29C 70/54*     (2006.01)
    *B32B 1/08*     (2006.01)
    *B32B 5/10*     (2006.01)
    *B32B 5/12*     (2006.01)
    *B32B 37/04*     (2006.01)
    *B32B 37/24*     (2006.01)
    *B32B 38/00*     (2006.01)
    *B32B 38/18*     (2006.01)
    *B29K 23/00*     (2006.01)
    *B29K 307/04*     (2006.01)
    *B29L 22/00*     (2006.01)
(52) U.S. Cl.
    CPC .................. *B32B 1/08* (2013.01); *B32B 5/10* (2013.01); *B32B 5/12* (2013.01); *B32B 37/04* (2013.01); *B32B 37/24* (2013.01); *B32B 38/0004* (2013.01); *B32B 38/1808* (2013.01); *B29K 2023/12* (2013.01); *B29K 2307/04* (2013.01); *B29K 2995/0097* (2013.01); *B29L 2022/00* (2013.01); *B32B 2250/20* (2013.01); *B32B 2260/023* (2013.01); *B32B 2260/046* (2013.01); *B32B 2262/106* (2013.01); *B32B 2305/073* (2013.01); *B32B 2305/54* (2013.01); *B32B 2307/718* (2013.01); *B32B 2307/732* (2013.01); *B32B 2307/738* (2013.01); *B32B 2309/105* (2013.01); *B32B 2313/04* (2013.01); *B32B 2323/10* (2013.01); *B32B 2597/00* (2013.01)

(56) References Cited

U.S. PATENT DOCUMENTS

| | | | |
|---|---|---|---|
| 2017/0241074 A1 | 8/2017 | Ono et al. | |
| 2018/0281711 A1 | 10/2018 | Khan et al. | |
| 2019/0137012 A1 | 5/2019 | Kuwajima et al. | |

FOREIGN PATENT DOCUMENTS

| | | | |
|---|---|---|---|
| EP | 1112169 | * | 5/2004 |
| JP | 6-270270 | | 9/1994 |
| JP | 8-150691 | | 6/1996 |
| JP | 2000-014843 | | 1/2000 |
| JP | 2005-270515 | | 10/2005 |
| JP | 2006-130698 | | 5/2006 |
| JP | 3821467 B | | 9/2006 |
| JP | 2011-062818 | | 3/2011 |
| JP | 2013-106782 | | 6/2013 |
| JP | 10 2012 104 370 | | 11/2013 |
| JP | 2018-172116 | | 11/2018 |
| WO | 00/15414 | | 3/2000 |
| WO | 2017/191735 | | 11/2017 |

OTHER PUBLICATIONS

Office Action issued in corresponding Japanese Patent Application No. 2021-565495, Aug. 6, 2024, 8 pages w/translation.
International Search Report issued in International Application No. PCT/JP2020/045616, Mar. 9, 2021, 4 pages w/translation.

* cited by examiner

FIBER-REINFORCED RESIN HOLLOW MOLDED BODY AND METHOD FOR PRODUCING SAME

TECHNICAL FIELD

The present invention relates to a fiber reinforced resin hollow molded body in which a semipreg is used, and a method for manufacturing the same.

BACKGROUND ART

Carbon fibers that are reinforcing fiber have been combined with various matrix resins, and the resultant fiber reinforced plastics have been widely used in various fields and various applications. Unidirectional continuous fibers with thermoplastic resin as a matrix resin have been used in the aerospace field and general industrial fields that require, e.g., high-level mechanical properties and heat resistance. Conventionally, prepregs obtained by fully impregnating a carbon fiber material with resin have been used. Prepregs are excellent in impact resistance as a composite material, are molded in a short time, and suggest the possibility of reducing costs of molding. However, prepregs obtained by fully impregnating resin have high hardness and poor softness, and thus are hard to be rolled up. Therefore, attention is focused on semipregs in which resin is not impregnated in a reinforcing fiber material. Semipregs are base sheets in which a matrix resin that adheres to a fiber material through fusion is not impregnated, or is semi-impregnated in the fiber material. Semipregs are soft and excellent in shape-ability. In addition, semipregs can be direct molded, and thus are excellent in molding efficiency.

In molding fiber reinforced resin, a fiber material needs to be impregnated with thermoplastic resin. In the case of staple fibers, they need to be processed into a nonwoven fabric, which greatly reduces efficiency. Moreover, in the case of continuous fibers, they may be misaligned and disturbed, or defects such as voids or wrinkles may be caused. Therefore, a more suitable semipreg material that can be used for direct molding has been required.

Patent Document 1 proposes to unify a fiber reinforced resin preform with a metal shaped body using an inflatable mandrel. Patent Document 2 proposes that a golf shaft should be manufactured by: winding the periphery of a mandrel having an internal-pressure holding tube with prepreg sheets in which filament fibers are oriented; winding a knot-shaped portion with a prepreg sheet in which staple fibers are two dimensionally and randomly oriented; and inflating the internal-pressure holding tube in a mold to press and heating them in order to form the golf shaft. Patent Document 3 proposes that a pipe should be manufactured by winding a tape-shaped fiber reinforced composite material containing specific fluorocarbon resin and reinforcing fibers around the periphery of a first layer. Patent Document 4 proposes to use, as a material to be molded into a pipe, a sheet-shaped material to be molded in which a nonwoven fabric made of thermoplastic resin is stacked on sheet materials. In each of the sheet materials, reinforcing fibers are oriented unidirectionally.

PRIOR ART DOCUMENTS

Patent Documents

Patent Document 1: JP 2018-172116 A
Patent Document 2: JP 2013-106782 A
Patent Document 3: WO 2017/191735 A1
Patent Document 4: JP 2011-062818 A

DISCLOSURE OF INVENTION

Problem to be Solved by the Invention

However, the base materials of the above conventional techniques are hard or cannot be handled alone, and are difficult to be used in hollow molding.

To solve the conventional problems, the present invention provides a fiber reinforced resin hollow molded body that is thin and excellent in shape-ability using a semipreg that is easy to be handled, and a method for manufacturing the same.

Means for Solving Problem

The present invention relates to a fiber reinforced resin hollow molded body in which a resin-integrated fiber sheet is used. The resin-integrated fiber sheet includes unidirectional continuous fibers that are spread fibers of a continuous fiber group and arrayed unidirectionally in parallel, and thermoplastic resin that is present at least on a surface of the unidirectional continuous fibers. In the hollow molded body, in a state where the resin-integrated fiber sheet or a plurality of the resin-integrated fiber sheets are stacked, the resin-integrated fiber sheet or the plurality of resin-integrated fiber sheets are wound to produce a wound body having an overlapping portion. The thermoplastic resin is impregnated in the unidirectional continuous fibers. The resin-integrated fiber sheet or the plurality of resin-integrated fiber sheets are consolidated.

The present invention relates to a method for manufacturing a fiber reinforced resin hollow molded body. In the manufacturing of the fiber reinforced resin hollow molded body, a resin-integrated fiber sheet is used. The resin-integrated fiber sheet includes unidirectional continuous fibers that are spread fibers of a continuous fiber group and arrayed unidirectionally in parallel, and thermoplastic resin that is present at least on a surface of the unidirectional continuous fibers. The method includes winding the resin-integrated fiber sheet or a plurality of the resin-integrated fiber sheets around a surface of an elastic body to produce a wound body having an overlapping portion in a state where the resin-integrated fiber sheet or the plurality of the resin-integrated fiber sheets are stacked; placing the elastic body wound with the resin-integrated fiber sheet or the plurality of resin-integrated fiber sheets in a heated mold having a hollow shape; performing pressure molding by supplying pressure fluid into the elastic body and melting the thermoplastic resin to impregnate the thermoplastic resin in the unidirectional continuous fibers in order to consolidate the resin-integrated fiber sheet or the plurality of resin-integrated fiber sheets.

Effects of the Invention

In the fiber reinforced resin hollow molded body of the present invention, a resin-integrated fiber sheet is used, and the resin-integrated fiber sheet includes unidirectional continuous fibers that are spread fibers of a continuous fiber group and arrayed unidirectionally in parallel, and thermoplastic resin that is present at least on a surface of the unidirectional continuous fibers. Therefore, it is possible to provide a fiber reinforced resin hollow molded body that is thin and excellent in shape-ability using a semipreg that is easy to handle, and a method for manufacturing the same. Moreover, the molding cycle is fast in the method for manufacturing the hollow molded body of the present invention, and thus a high-quality hollow molded body can be produced by the method in a short time.

DESCRIPTION OF REFERENCE NUMERALS

Figure 1A:
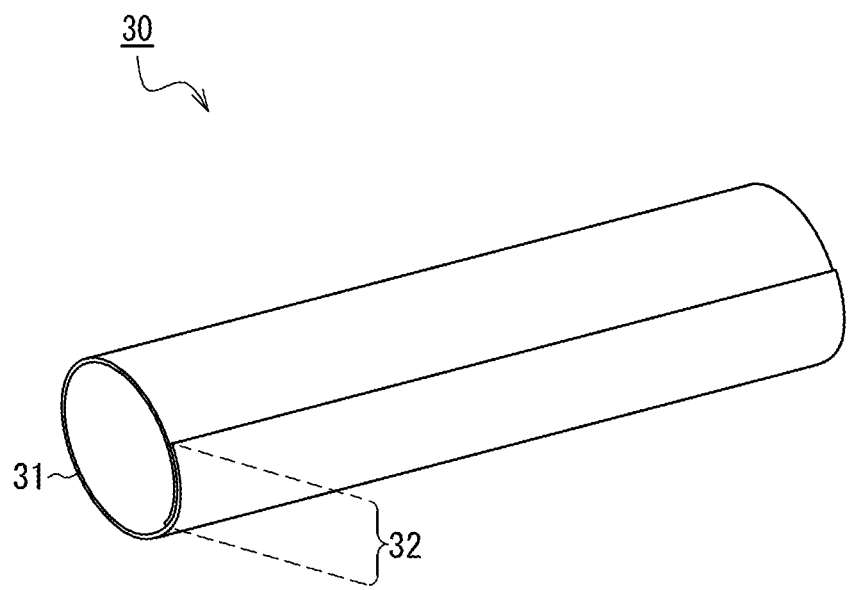
FIG. 1A is a schematic perspective diagram of a fiber reinforced resin hollow molded body according to an embodiment of the present invention.

1 Resin-integrated carbon fiber sheet
2 Unidirectional carbon fiber
3, 3a, 3b Bridging fiber
4 Resin
5 Part to which resin does not adhere
6 Spreading device
7 Feed bobbin
8 Carbon fiber filament group (carbon fiber tow before spreading)
9a, 9b Nip roller
12a-12b Bridge roller
13a-13g Guide roller
14, 17 Powder feed hopper
15, 18 Dry resin powder
16, 19 Heater
20 Take-up roller
21a-21j Spreading roller
23 Roller spreading process
24 Bridging fiber generating process
25 Resin powder applying process
30 Hollow molded body
31 Fiber reinforced resin portion
32 Overlapping portion of resin-integrated carbon fiber sheet
33a, 33b Resin-integrated carbon fiber sheet
34 Lapping portion
35 Mandrel
36 Jig
37 Resin-integrated carbon fiber sheet
39 Lower mold
40 Upper mold
41 Air supply port

DESCRIPTION OF THE INVENTION

The present invention relates to a fiber reinforced resin hollow molded body in which a resin-integrated fiber sheet is used (hereinafter, the fiber reinforced resin hollow molded body may also be referred to as a "hollow molded body"). The resin-integrated fiber sheet includes unidirectional continuous fibers that are spread fibers of a continuous fiber group and arrayed unidirectionally in parallel, and thermoplastic resin that is present at least on a surface of the unidirectional continuous fibers. In the hollow molded body of the present invention, in a state where the resin-integrated fiber sheet or a plurality of the resin-integrated fiber sheets are stacked, the resin-integrated fiber sheet or the plurality of resin-integrated fiber sheets are wound to produce a wound body having an overlapping portion. Moreover, the thermoplastic resin is impregnated in the fiber sheet or the fiber sheets. Furthermore, the resin-integrated fiber sheet or the plurality of resin-integrated fiber sheets are consolidated. The resin-integrated fiber sheet used for manufacturing the hollow molded body preferably includes bridging fibers that lie in directions crossing the unidirectional continuous fibers. Moreover, the thermoplastic resin preferably unifies the unidirectional continuous fibers with the bridging fibers. The resin-integrated fiber sheet may include auxiliary threads oriented in another fiber direction on the unidirectional continuous fibers. The auxiliary threads maintain a constant orientation of the fibers constituting the fiber sheet. Examples of the auxiliary threads include glass fibers, aramid fibers, polyester fibers, nylon fibers, and vinylon fibers.

The resin-integrated fiber sheet used in the present invention includes the unidirectional continuous fibers spread and arrayed unidirectionally in parallel as primary fibers. The unidirectional continuous fibers are unidirectional filament fibers. The resin-integrated fiber sheet preferably includes the bridging fibers that lie in directions crossing the unidirectional continuous fibers as secondary fibers. Here, the resin-integrated fiber sheet includes the primary fibers preferably in an amount of 75 to 99% by mass and the secondary fibers preferably in an amount of 1 to 25% by mass based on 100% by mass of the fibers of the resin-integrated fiber sheet. Preferably, the thermoplastic resin in a powder form is applied to the unidirectional continuous fibers and the bridging fibers from above and thermally fused at least on the surface of the unidirectional continuous fibers to unify the unidirectional continuous fibers with the bridging fibers. The unidirectional continuous fibers are unified with the bridging fibers by the thermally fused thermoplastic resin, and thus the resin-integrated fiber sheet achieves good handleability and good operability in stacking (including stacking with winding) and molding.

The resin-integrated fiber sheet is preferably a semipreg in which the thermoplastic resin in a powder form that serves as a matrix adheres to the surface of the unidirectional continuous fibers through thermal fusion. The thermoplastic resin on a surface of the semipreg uniformly permeates and spreads through the resin-integrated fiber sheet and between the plurality of resin-integrated fiber sheets by molding. Thus, it is possible to obtain a hollow molded body that is excellent in shape-ability (moldability) and prevents a void.

The mass proportion of the unidirectional continuous fibers is preferably 75 to 99% by mass, more preferably 80 to 97% by mass, and further preferably 85 to 97% by mass based on 100% by mass of the total of the unidirectional continuous fibers and the bridging fibers. Moreover, the mass proportion of the bridging fibers is preferably 1 to 25% by mass, more preferably 3 to 20% by mass, and further preferably 3 to 15% by mass based on 100% by mass of the total of the unidirectional continuous fibers and the bridging fibers. Within the above range of the mass proportion, the unidirectional continuous fibers of the resin-integrated fiber sheet are unified well, and the tensile strength of the resin-integrated fiber sheet is high in the width direction.

The fiber volume (Vf) of the resin-integrated fiber sheet is preferably 20 to 65% by volume, and the volume of the thermoplastic resin thereof is preferably 35 to 80% by volume. The fiber volume is more preferably 25 to 60% by volume, and the volume of the thermoplastic resin is more preferably 40 to 75% by volume. Thus, the resin component of the resin-integrated fiber sheet can serve as a matrix resin component of the hollow molded body. That is, no additional resin needs to be added in manufacturing the hollow molded body. The mass of the resin-integrated fiber sheet per unit area is preferably 10 to 3000 $g/m^2$, more preferably 20 to 2000 $g/m^2$, and further preferably 30 to 1000 $g/m^2$.

The fibers are preferably at least one selected from the group consisting of carbon fibers, glass fibers, and high elastic modulus fibers having an elastic modulus of 380 cN/dtex or more. Examples of the high elastic modulus fibers include aramid fibers, in particular para-aramid fibers (elastic modulus: 380 to 980 cN/dtex), polyarylate fibers (elastic modulus: 600 to 741 cN/dtex), heterocyclic polymer fibers (PBO, elastic modulus: 1060 to 2200 cN/dtex), high molecular weight polyethylene fibers (elastic modulus: 883 to 1413 cN/dtex), polyvinyl alcohol fibers (PVA, strength: 14 to 18 cN/dtex). See "Seni No Hyakkajiten (encyclopedia of fibers)", p. 522, published by Maruzen Co., Ltd., published on Mar. 25, 2002. These fibers are useful as resin reinforcing fibers. In particular, carbon fibers are useful.

The resin-integrated fiber sheet has a thickness of preferably 0.01 to 5.0 mm. Within this range of the thickness, the resin-integrated fiber sheet is easily molded. In forming the hollow molded body, the resin-integrated fiber sheet or two or more of the resin-integrated fiber sheets are stacked and wound. The number of the resin-integrated fiber sheets to be stacked is preferably 2 to 20, and more preferably 3 to 15.

Examples of the thermoplastic resin include polyamide resins, polycarbonate resins, polypropylene resins, polyester resins, polyethylene resins, acrylic resins, phenoxy resins, polystyrene resins, polyimide resins, and polyether ether ketone resins. However, the thermoplastic resin is not limited to these.

A preferable adhesion state of the resin of the resin-integrated fiber sheet of the present invention is such that melt-solidified resin adheres to or near a surface of the spread fiber sheet and is not impregnated inside the spread fiber sheet or is only partially impregnated in the fiber sheet. The plurality of resin-integrated fiber sheets with the above adhesion state of the resin can be suitably stacked and molded.

When the spread fiber sheet includes carbon fibers, the width of the spread fiber sheet is preferably 0.1 to 5.0 mm per 1000 constituent fibers. Specifically, when a large tow (e.g., 50K or 60K) is used, the spread fiber sheet has a width of about 0.1 to 1.5 mm per 1000 constituent fibers. When a regular tow (e.g., 12K or 15K) is used, the spread fiber sheet has a width of about 0.5 to 5.0 mm per 1000 constituent fibers. Here, "K" indicates 1000 constituent fibers. The larger the number of fibers in a tow, the more likely that the fibers will be twisted, and the tow will not be spread easily. The width of the spread fiber sheet becomes narrower accordingly. In the method of the present invention, tows before spreading available from carbon fiber manufacturers can be opened and formed into easy-to-use spread fiber sheets, which can be used for forming various hollow molded bodies. The carbon fiber bundle (tow) to be used for manufacturing the resin-integrated fiber sheet preferably includes 5,000 to 50,000 fibers per bundle, and the number of the carbon fiber bundles (tows) to be fed to a spreading device is preferably 10 to 280. When a plurality of carbon fiber bundles (tows) are fed and spread in this way to form a single sheet, the sheet tends to cleave between the carbon fiber bundles (tows). Bridging fibers lying in various directions and being adhesively fixed to the spread fiber sheet with resin can prevent such cleavage between the tows.

The average length of the bridging fibers is preferably 1 mm or more, and more preferably 5 mm or more. Within the above range of the average length of the bridging fibers, the carbon fiber sheet can be strong in the width direction and excellent in handleability.

A production method of the resin-integrated fiber sheet used for manufacturing the hollow molded body of the present invention includes the following processes, for example. The production method will be described using a carbon fiber sheet as a fiber sheet:

(1) spreading a carbon fiber filament group by at least one selected from the group consisting of passage through a plurality of rollers, passage through a spreading bar, and air spreading, and arraying spread carbon fibers of the carbon fiber filament group unidirectionally in parallel; and generating bridging fibers from the carbon fiber filament group during or after spreading of the carbon fiber filament group or dropping bridging fibers on the carbon fiber sheet during or after spreading of the carbon fiber filament group such that one or more of the bridging fibers are present on average per 10 $mm^2$ of the carbon fiber sheet. In the case of adopting passage through rollers or a spreading bar for spreading the carbon fiber filament group, the bridging fibers can be generated from the carbon fiber filament group by tensioning the carbon fiber filament group during spreading. The tension of the carbon fiber filament group may be in a range from 2.5 to 30 N per 15,000 filaments, for example. In the case of adopting air spreading, the bridging fibers are generated preferably by rollers or a spreading bar after air spreading. When the bridging fibers are generated from the carbon fiber filament group, the bridging fibers are in a state of crossing the carbon fibers constituting the carbon fiber sheet. Here, crossing includes tangling. For example, the bridging fibers are partially or entirely present inside the carbon fiber sheet and stereoscopically cross the carbon fibers arrayed unidirectionally;

(2) applying resin powder to the spread carbon fiber sheet; and (3) heat-melting the resin powder in a pressure-free state (no pressure applied) and cooling it so that the resin is present at least on part of the surface of the carbon fiber sheet. At this time, the resin on the surface adhesively fixes the bridging fibers to the carbon fiber sheet.

The hollow molded body of the present invention is produced in the following manner. The resin-integrated fiber sheet or two or more of the resin-integrated fiber sheets are stacked and wound around the surface of an elastic body to produce the wound body having the overlapping portion, and are molded. In the state where the resin-integrated fiber sheet or the plurality of resin-integrated fiber sheets are stacked, the resin-integrated fiber sheet or the plurality of resin-integrated fiber sheets are preferably wound for at least two turns. The length of the overlapping portion is preferably 3 mm or more, and more preferably 10 mm or more. In the present invention, when the resin-integrated fiber sheet or the plurality of resin-integrated fiber sheets are wound for two turns, the length of the overlapping portion corresponds to the circumference thereof. When the resin-integrated fiber sheet or the plurality of resin-integrated fiber sheets are wound for three turns, the length of the overlapping portion is twice as long as the circumference thereof. When two or more of the resin-integrated fiber sheets are stacked, the fiber directions of the unidirectional continuous fibers (the longitudinal directions of the fibers constituting the unidirectional continuous fibers) thereof can be different. The elastic body may be a mandrel. For example, when two of the resin-integrated fiber sheets are stacked, one can be oriented at 0° and the other can be oriented at 90°. Thus, it is possible to obtain a hollow molded body having mechanical properties required for a hollow molded body. When one resin-integrated fiber sheet is used, it is possible to obtain, e.g., a long molded body in which the resin-integrated fiber sheet is wound obliquely relative to the length direction of a mandrel, or a hollow molded body in which the resin-integrated fiber sheet is wound for a plurality of turns in a direction 90° relative to the length direction of a mandrel. The hollow molded body can be, e.g., a pipe, a shaft, and a frame and have, e.g., a circular hollow or a quadrangular hollow in cross section. Other molded bodies having various hollows in cross section are also possible.

The hollow molded body of the present invention is preferably formed using fluid that expands outward in a hollow of the wound body. The fluid may be, e.g., pressure fluid such as pressure air.

In one embodiment, a method for manufacturing the hollow molded body of the present invention includes the following processes:
  (a) winding the resin-integrated fiber sheet or the plurality of resin-integrated fiber sheets around the surface of the elastic body to produce the wound body having the overlapping portion;
  (b) placing the elastic body wound with the resin-integrated fiber sheet or the plurality of resin-integrated fiber sheets in a heated mold having a hollow shape and performing pressure molding (for example, bringing the resin-integrated fiber sheet or the plurality of resin-integrated fiber sheets into close contact with the heated mold using compressed air to obtain a target shape) by supplying pressure fluid into the elastic body; and
  (c) melting the thermoplastic resin to impregnate the thermoplastic resin in the unidirectional continuous fibers in order to consolidate the wound resin-integrated fiber sheet or the plurality of resin-integrated fiber sheets.

In another embodiment, the method for manufacturing the hollow molded body of the present invention includes the following processes:
  (a') winding the resin-integrated fiber sheet or the plurality of resin-integrated fiber sheets around the surface of the elastic body;
  (b') placing the elastic body wound with the resin-integrated fiber sheet or the plurality of resin-integrated fiber sheets in a heated mold having a hollow cavity;
  (c') performing hollow molding by supplying pressure fluid into the elastic body to inflate the resin-integrated fiber sheet or the plurality of resin-integrated fiber sheets outward from the elastic body and melting the thermoplastic resin to impregnate the thermoplastic resin in the entire stack (the entire resin-integrated fiber sheet or resin-integrated fiber sheets wound); and
  (d') then performing cooling.

In the process (a) and the process (a'), when the plurality of resin-integrated fiber sheets are wound, the plurality of resin-integrated fiber sheets are preferably stacked such that the fiber directions of the unidirectional continuous fibers thereof are different, and are wound. Thus, it is possible to obtain a hollow molded body having mechanical properties required for a hollow molded body. Moreover, the resin-integrated fiber sheet or the plurality of resin-integrated fiber sheets may be wound directly around the surface of the elastic body. Alternatively, the resin-integrated fiber sheet or the plurality of resin-integrated fiber sheets may be wound to produce a preform, and then the preform may be placed around the surface of the elastic body.

Figure 1B:
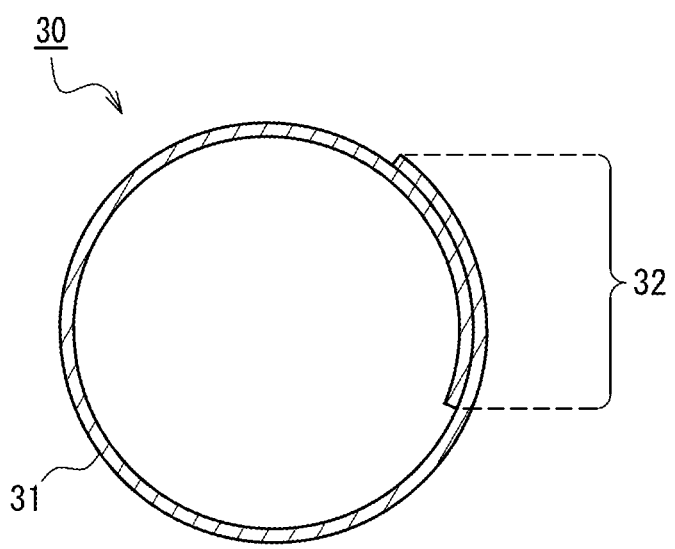
FIG. 1B is a schematic cross-sectional diagram of the fiber reinforced resin hollow molded body.

Next, the present invention will be described with reference to the drawings. In the drawings, the same reference numerals are assigned to the same components. FIG. 1A is a schematic perspective diagram of a hollow molded body 30 according to an embodiment of the present invention. FIG. 1B is a schematic cross-sectional diagram of the hollow molded body. The hollow molded body 30 is hollow in the length direction. In a fiber reinforced resin portion 31, a plurality of resin-integrated carbon fiber sheets are stacked on each other and are consolidated. Reference numeral 32 denotes an overlapping portion of the resin-integrated carbon fiber sheets. The hollow molded body 30 has a diameter (outer diameter) of preferably 10 to 200 mm, a length of preferably 50 to 5000 mm, and a wall thickness of preferably 0.03 to 5 mm, and more preferably 0.04 to 5 mm.

Figure 2:
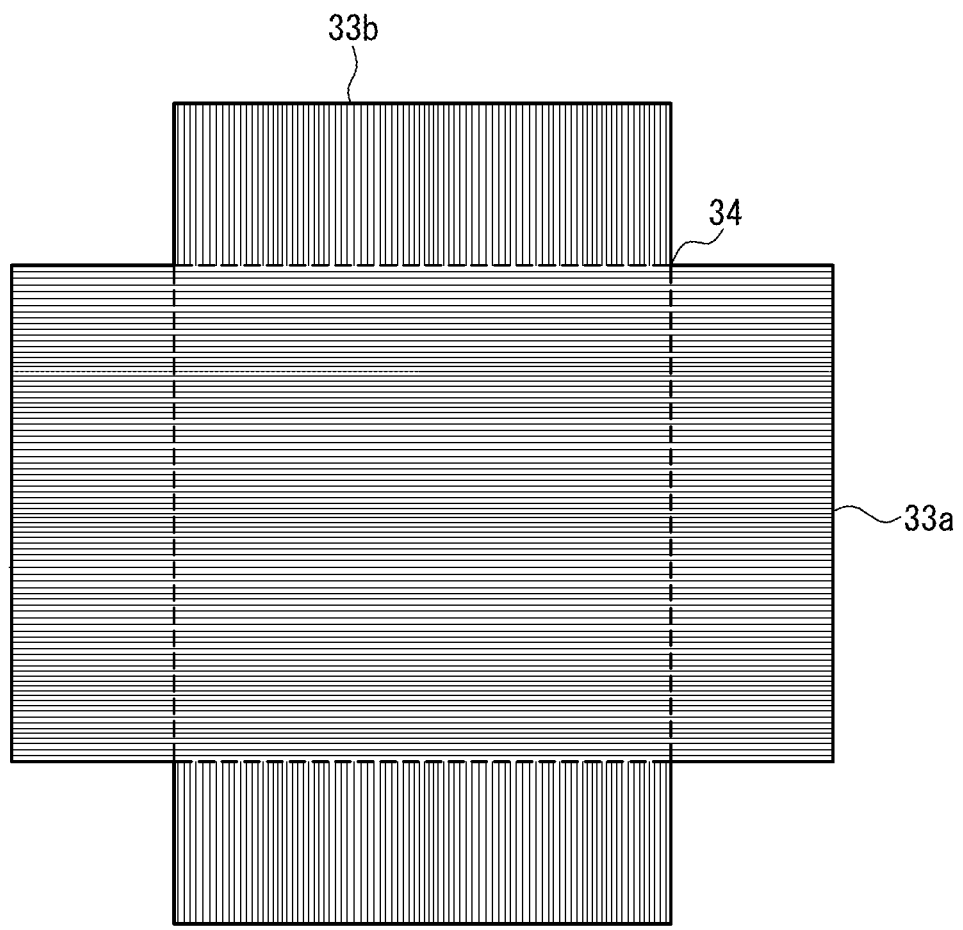
FIG. 2 is a schematic explanatory diagram illustrating a way to stack resin-integrated carbon fiber sheets used for forming the fiber reinforced resin hollow molded body in FIG. 1.

FIG. 2 is a schematic explanatory diagram illustrating a way to stack resin-integrated carbon fiber sheets used for forming the fiber reinforced resin hollow molded body in FIG. 1. A resin-integrated carbon fiber sheet 33a includes unidirectional continuous fibers oriented at 0°. A resin-integrated carbon fiber sheet 33b includes unidirectional continuous fibers oriented at 90°. A portion 34 in which the resin-integrated carbon fiber sheets 33a and 33b are lapped on each other is cut out of the sheets and wound around a mandrel. The portion may be wound for one turn or a plurality of turns. When the portion is wound for one turn, a part of the portion is lapped on another part thereof.

Figure 3A:
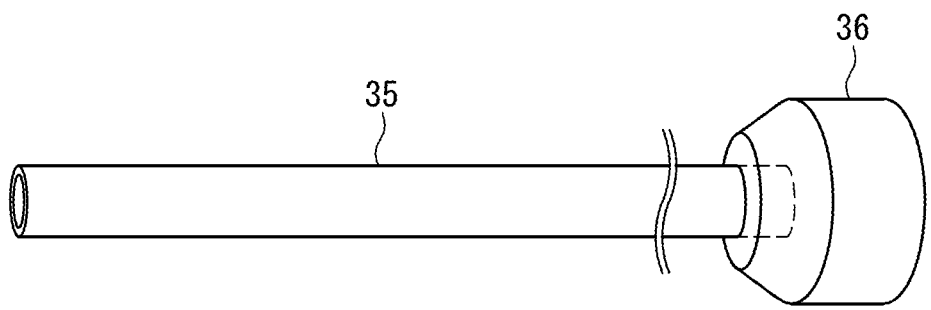
FIG. 3A is a schematic perspective diagram of a mandrel used for hollow molding.
Figure 3B:
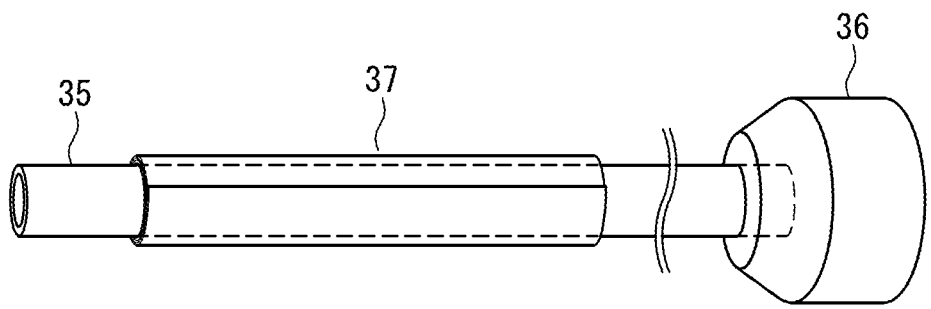
FIG. 3B is a schematic perspective diagram of the mandrel wound with a resin-integrated carbon fiber sheet.
Figure 3C:
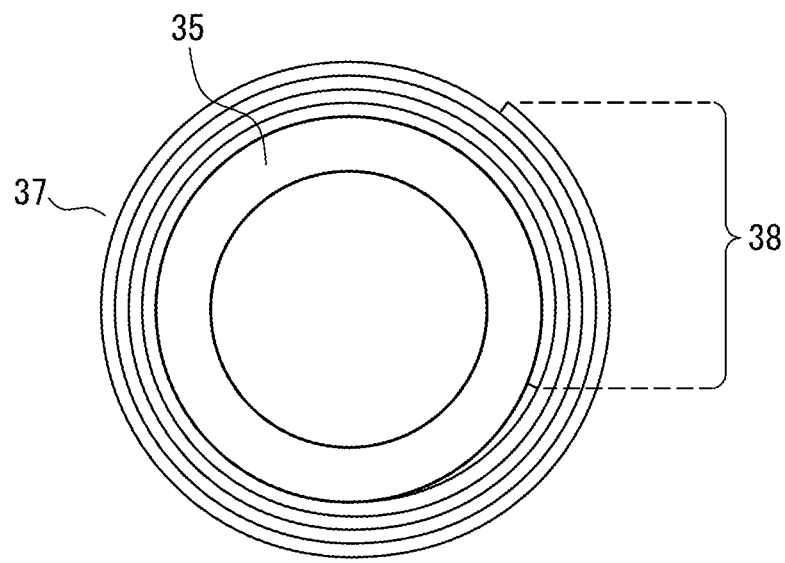
FIG. 3C is a cross-sectional diagram of FIG. 3B.

FIG. 3A is a schematic perspective diagram of a mandrel 35 used for hollow molding. FIG. 3B is a schematic perspective diagram of the mandrel 35 wound with a resin-integrated carbon fiber sheet 37. FIG. 3C is a cross-sectional diagram of FIG. 3B. A jig 36 is mounted to one end of the mandrel 35 to seal pressure fluid in the mandrel. The mandrel may be, e.g., a tube made of fluororubber (heat resistance limit temperature: 230° C.) or silicone rubber (heat resistance limit temperature: 230° C.) and have, e.g., an outer diameter of 19 mm, an inner diameter of 15 mm, and a length of 500 mm. In FIG. 3C, the resin-integrated carbon fiber sheet is wound for n turns, and the length of the overlapping portion is the sum of the circumference of the sheet wound for n−1 turns and the length of a part denoted by reference numeral 38 in the figure.

Figure 4A:
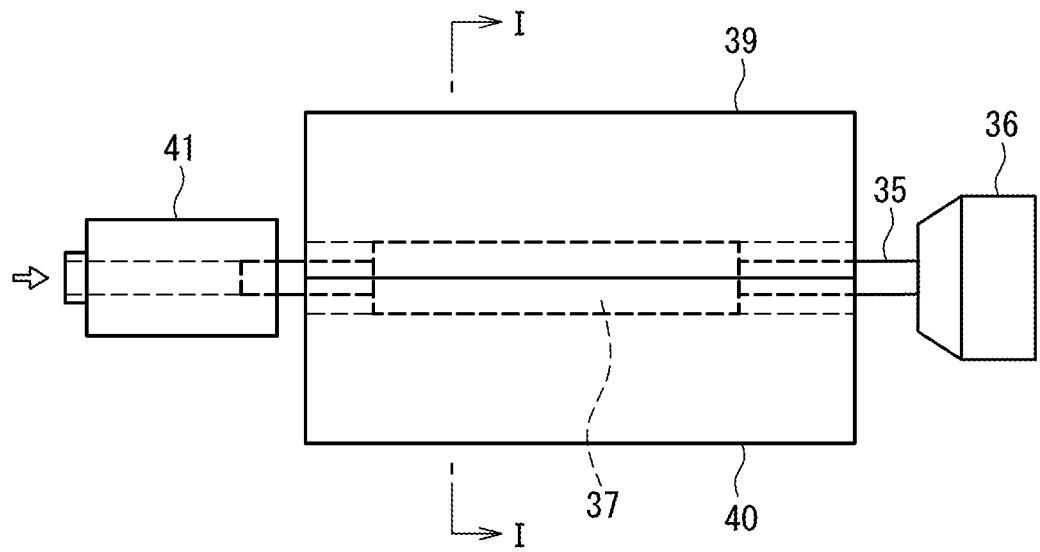
FIG. 4A is a schematic plan diagram illustrating a state where the mandrel wound with the resin-integrated carbon fiber sheet is placed in a forming mold.
Figure 4B:
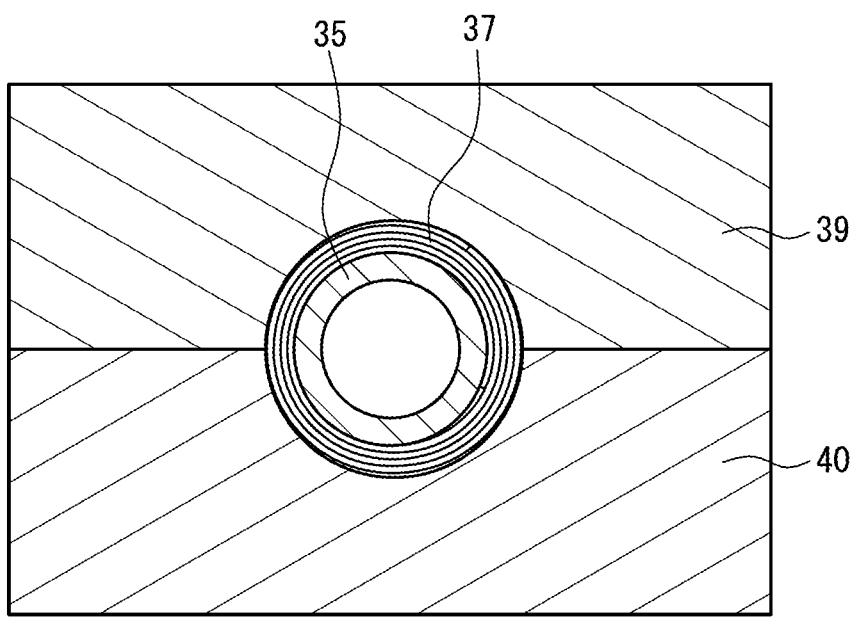
FIG. 4B is a cross-sectional diagram taken along the line I-I of FIG. 4A.

FIG. 4A is a schematic plan diagram illustrating a state where the mandrel 35 wound with the resin-integrated carbon fiber sheet 37 is placed in a forming mold. FIG. 4B is a cross-sectional diagram taken along the line I-I of FIG. 4A. The forming mold is constituted by a lower mold 39 and an upper mold 40, and is heated. The mandrel 35 wound with the resin-integrated carbon fiber sheet 37 is placed in the forming mold. Compressed air is supplied through an air supply port 41 fixed to the other end of the mandrel 35 to inflate the mandrel. Thus, the resin-integrated carbon fiber sheet 37 wound around the mandrel 35 is inflated to be brought in contact with the forming mold and heated by the forming mold so that the thermoplastic resin on a surface of the resin-integrated carbon fiber sheet 37 is melted and impregnated in the entire stack (i.e., the entire resin-integrated carbon fiber sheet 37 wound). Next, the forming mold is cooled by water. Thus, the fiber reinforced resin hollow molded body is obtained.

Figure 5:
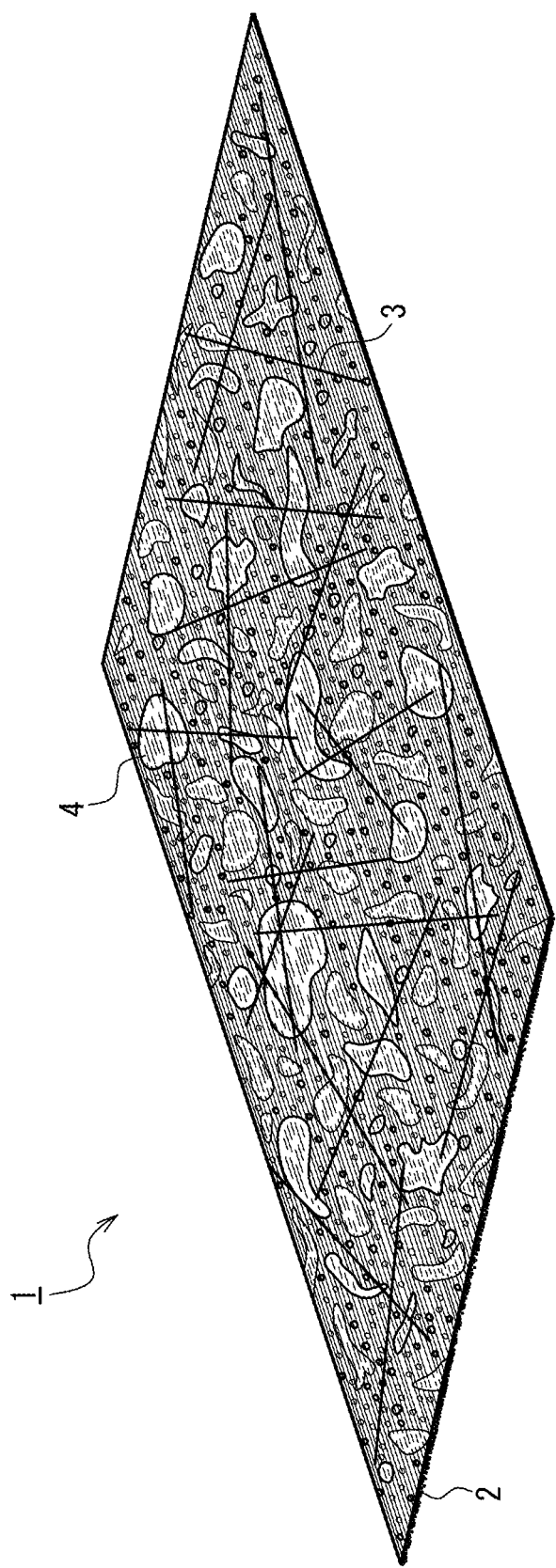
FIG. 5 is a schematic perspective view of a resin-integrated carbon fiber sheet used for forming the fiber reinforced resin hollow molded body according to an embodiment of the present invention.
Figure 6:
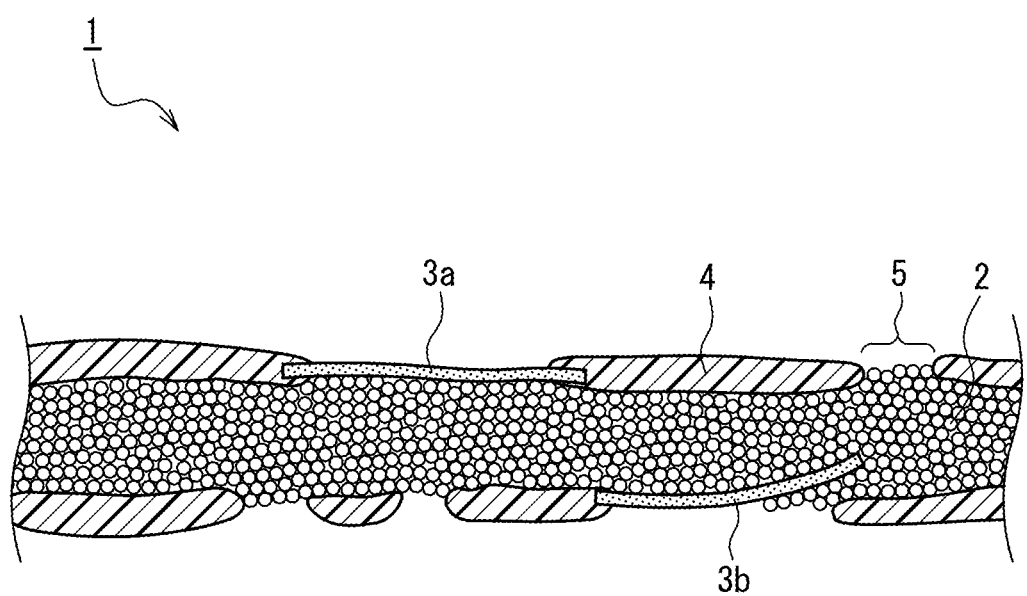
FIG. 6 is a schematic cross-sectional view of the resin-integrated carbon fiber sheet illustrated in FIG. 5.

FIG. 5 is a schematic perspective view of a resin-integrated carbon fiber sheet 1 used for manufacturing the hollow molded body according to an embodiment of the present invention. FIG. 6 is a schematic cross-sectional view of the resin-integrated carbon fiber sheet 1. Bridging fibers 3 are oriented in various directions on a surface of unidirectional carbon fibers 2 spread. Melt-solidified resin 4 adheres to or near the surface of the unidirectional carbon fibers 2. The resin 4 is not impregnated inside the unidirectional carbon fibers 2, or is only partially impregnated in the unidirectional carbon fibers. The resin 4 fixes the bridging fibers 3 adhesively to the surface of the unidirectional carbon fibers 2. As illustrated in FIG. 6, bridging fibers 3*a* and 3*b* are present on the surface of the unidirectional carbon fibers 2. The bridging fiber 3*a* entirely lies on the surface of the unidirectional carbon fibers 2. The bridging fiber 3*b* is partially present on the surface of the unidirectional carbon fibers 2, and partially enters the unidirectional carbon fibers and crosses some of them. The resin 4 fixes the bridging fibers 3 adhesively to the surface of the unidirectional carbon fibers 2. The surface of the unidirectional carbon fibers 2 includes parts to which the resin 4 adheres and parts 5 to which the resin does not adhere. The parts 5 to which resin does not adhere serve as paths through which air inside the fiber sheet escapes during formation of a fiber reinforced resin molded product by heating a plurality of stacked resin-integrated carbon fiber sheets 1. Applying pressure enables the surface resin to be easily impregnated into the entire fiber sheet. Thus, the resin 4 becomes a matrix resin of the fiber reinforced resin hollow molded body.

Figure 7:
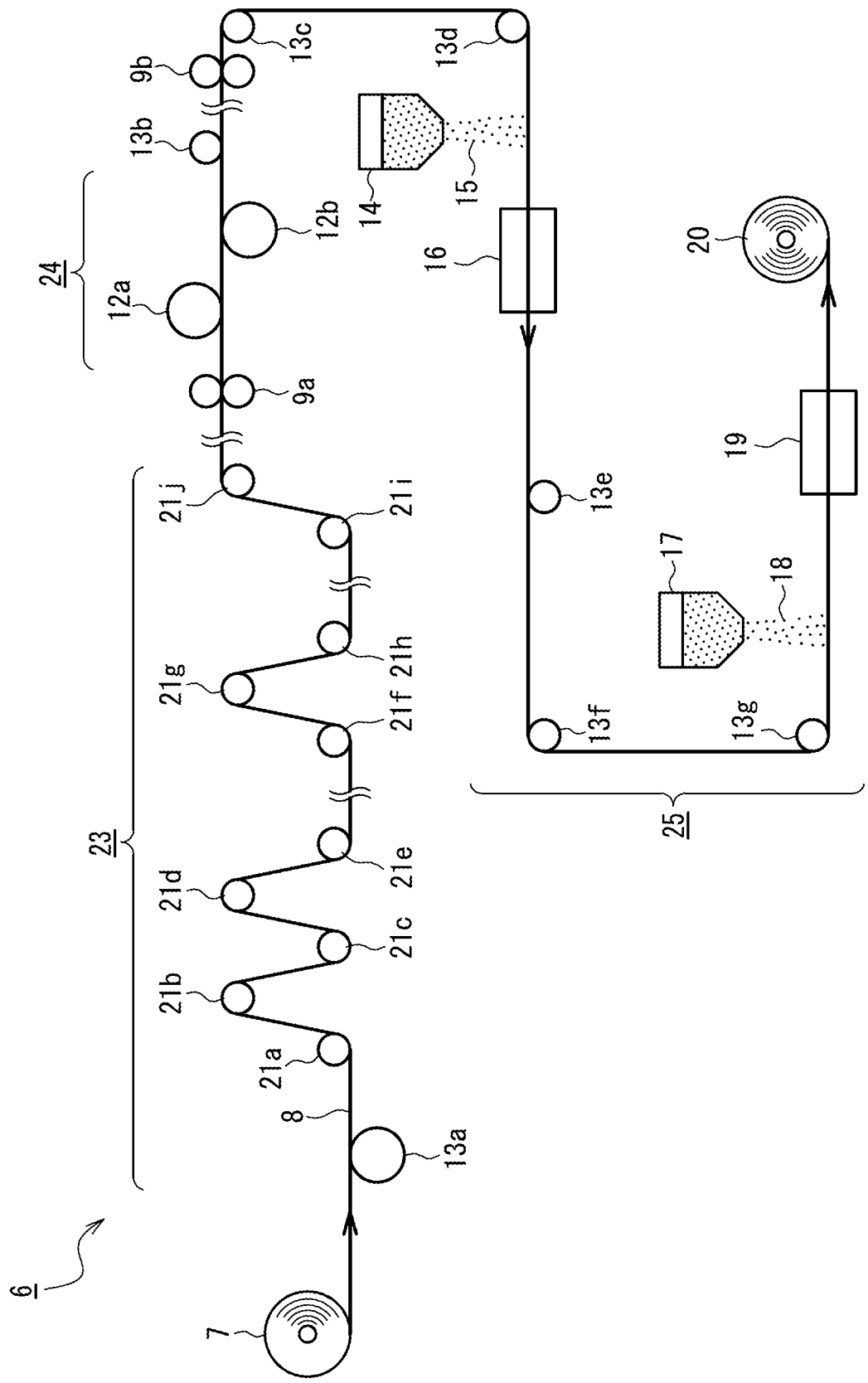
FIG. 7 is a schematic process diagram illustrating a production method of the resin-integrated carbon fiber sheet illustrated in FIG. 5.

FIG. 7 is a schematic process diagram illustrating a production method of a resin-integrated carbon fiber sheet used for manufacturing the hollow molded body according to an embodiment of the present invention. Carbon fiber filament groups (tows) 8 are fed from multiple feed bobbins 7 (In FIG. 7, only one feed bobbin is illustrated, and the remaining feed bobbins are omitted) and conveyed between spreading rollers 21*a* to 21*j*. Thus, the carbon fiber filament groups are spread (roller spreading process 23). Air spreading may be used instead of roller spreading. The spreading rollers may be fixed, rotate, or vibrate in the width direction.

After the spreading process, the spread tows are nipped between nip rollers 9*a* and 9*b* and conveyed between bridge rollers 12*a* and 12*b* disposed therebetween while being tensioned at, e.g., 2.5 to 30 N per 15,000 filaments (corresponding to a carbon fiber filament group fed from one feed bobbin) to generate bridging fibers (bridging fiber generating process 24). The bridge rollers may rotate or vibrate in the width direction. The bridge rollers may have, e.g., a pearskin finish surface, an uneven surface or a mirror surface, and generate bridging fibers through bending of the carbon fiber filament groups, fixation, rotation, vibration in the width direction, or a combination of these. Reference numerals 13*a* to 13*g* denote guide rollers.

Then, dry resin powder 15 is sprinkled on the front surface of the spread fiber sheet from a powder feed hopper 14. The sheet is fed into a heater 16 in a pressure-free state so that the dry resin powder 15 is heated and melted, and is cooled between the guide rollers 13*e* to 13*g*. Thereafter, dry resin powder 18 is sprinkled on the back surface of the spread fiber sheet from a powder feed hopper 17. The sheet is fed into a heater 19 in a pressure-free state so that the dry resin powder 18 is heated and melted, and is cooled and taken up on a take-up roller 20 (resin powder applying process 25). The dry resin powders 15 and 18 may be, e.g., polypropylene resin (melting point: 150° C. to 165° C.). The temperatures inside the heaters 16 and 19 may be, e.g., 5° C. to 60° C. higher than the melting point, softening point, or pour point of the dry resin powder, and the residence times therein may be, e.g., 4 seconds each. Thus, the spread carbon fiber sheet can be strong in the width direction and handled as a sheet without separation of the constituent carbon fibers.

For application of the resin powder, powder coating, electrostatic coating, spraying, fluidized-bed coating or the like may be adopted. Powder coating is preferred in which resin powder is dropped on the surface of a spread carbon fiber sheet. For example, dry resin powder is sprinkled on a spread carbon fiber sheet.

Advantages of the present invention will be summarized below.

(1) The resin-integrated carbon fiber sheet is a semipreg rather than a prepreg, and thus can be direct molded. Therefore, the hollow molded body can be formed without softening a material before molding or transferring a softened material to a forming mold. Moreover, the shaping of the resin-integrated carbon fiber sheet can be performed almost simultaneously with the impregnating of the thermoplastic resin into the entire fiber material.

(2) Since the resin-integrated carbon fiber sheet is a semipreg rather than a prepreg, it can be molded in a high cycle and is excellent in shape-ability and moldability.

(3) Since the thermoplastic resin in a powder form is thermally fused, the thermoplastic resin is impregnated between fibers well. That is, unlike resin in the form of a film, air escapes very well in forming the hollow molded body, and voids are less likely to be caused.

(4) For example, continuous fibers such as carbon fibers (rather than staple fibers) are primary fibers of the resin-integrated fiber sheet. Thus, it is possible to obtain a hollow molded body that is thin and strong.

(5) In the present invention, since a semipreg is used, the thermal history of the resin can be reduced as is clear from the following comparison. Thus, the resin can be prevented from deteriorating.

Prepreg: long time heating in producing a sheet+preheating (softening of the prepreg)+heating in molding+heating in thermally curing Semipreg: short time heating in producing a sheet+heating in molding As above, a semipreg can be molded in a short time.

(6) A softened prepreg is cooled when transferred to a forming mold. Thus, the smoothness of the surface of a molded product (transferability of a mold) is poor. In the present invention, direct molding is possible, and thus the smoothness of the surface of a molded product is good.

(7) A softened prepreg is cooled when transferred to a forming mold. Thus, a molded product needs to have a certain wall thickness (i.e., a thin molded product cannot be produced). In the present invention, direct molding is possible, and thus it is unnecessary to transfer a preheated material (prepreg) before molding to a forming mold. Thus, a thin hollow molded body can be produced.

EXAMPLES

Hereinafter, the present invention will be described specifically by way of examples. However, the present invention is not limited to the following examples.

Example 1

(1) Carbon Fiber Tow

Carbon fiber tows manufactured by Mitsubishi Chemical Corporation were used (product number: PYROFILE TR 50S15L, form: regular tow, filament count: 15K (15,000 filaments), filament diameter: 7 μm). An epoxy-based compound as a sizing agent was applied to the carbon fiber tow.

(2) Spreading Tow

The tows were spread using a spreading device of FIG. 7 (spreading process). The tension of the carbon fiber filament groups (tows) in the spreading process was 15 N per 15,000 filaments. In this manner, a spread fiber sheet constituted by 15K carbon fiber filaments and having a spread width of 500 mm and a thickness of 0.08 mm was prepared. Bridging fibers were present in an amount of 3.3% by mass.

(3) Semipreg

Polypropylene (melting point: 150° C. to 165° C.) manufactured by Prime Polymer Co., Ltd. was used as dry resin powder. The average particle diameter of the dry resin powder was 80 μm. The average amount of the resin applied was 28.2 g on one surface (56.4 g on both surfaces) per 1 m$^2$ of the carbon fibers. The temperatures inside the heaters 16 and 19 were 220° C., and the residence times therein were 8 seconds each (resin powder applying process). The mass of the resultant resin-integrated fiber sheet was 132.4 g/m$^2$, with the thickness being 0.2 mm, the fiber volume (Vf) being 40% by volume, and the thermoplastic resin being 60% by volume.

(4) Stacking Condition

The number of stacked resin-integrated fiber sheets: two sheets (four sheets at an overlapping portion, the length of the overlapping portion: 53.9 mm)

The fiber directions of the resin-integrated fiber sheets: two directions (stacked orthogonal to each other), 0°/90° (outside: 90°)

(5) Hollow Molding

A device illustrated in FIG. 4 was used to perform hollow molding under the following conditions.

Molding temperature: 200° C.
Air pressure: 0.6 MPa
Heat molding time: 3 minutes
Water cooling time: 5 minutes After cooling, an air line was shut off, and the resultant hollow molded body was removed from the mold.

Example 2

A hollow molded body of Example 2 was tested in the same manner as in Example 1 except that resin-integrated fiber sheets were stacked under the following conditions, and the heat molding time was 5 minutes.

The number of stacked resin-integrated fiber sheets: four sheets (eight sheets at an overlapping portion, the length of the overlapping portion: 53.1 mm)

The fiber directions of the resin-integrated fiber sheets: two directions (stacked orthogonal to each other), 0°/90°/0°/90° (outside: 90°)

Evaluation

Dimensions of the hollow molded body (pipe) of each of Examples 1 and 2 were measured. The diameter (outer diameter) and length thereof were measured using a caliper. Wall thicknesses thereof were measured with a micrometer. The wall thicknesses were obtained by measuring wall thicknesses at five points in the following measured portions and averaging the resultant values. Table 1 indicates the results.

TABLE 1

| Table1 | Length (mm) | Diameter (mm) | Wall thickness (mm) | |
|---|---|---|---|---|
| | | | Measured portion | Average value |
| Example 1 | 146.9 | 29.7 | Portion of two sheets | 0.360 |
| | | | Portion of four sheets (Overlapping portion) | 0.507 |
| Example 2 | 202.8 | 31.2 | Portion of four sheets | 0.462 |
| | | | Portion of eight sheets (Overlapping portion) | 0.727 |

Figure 8:
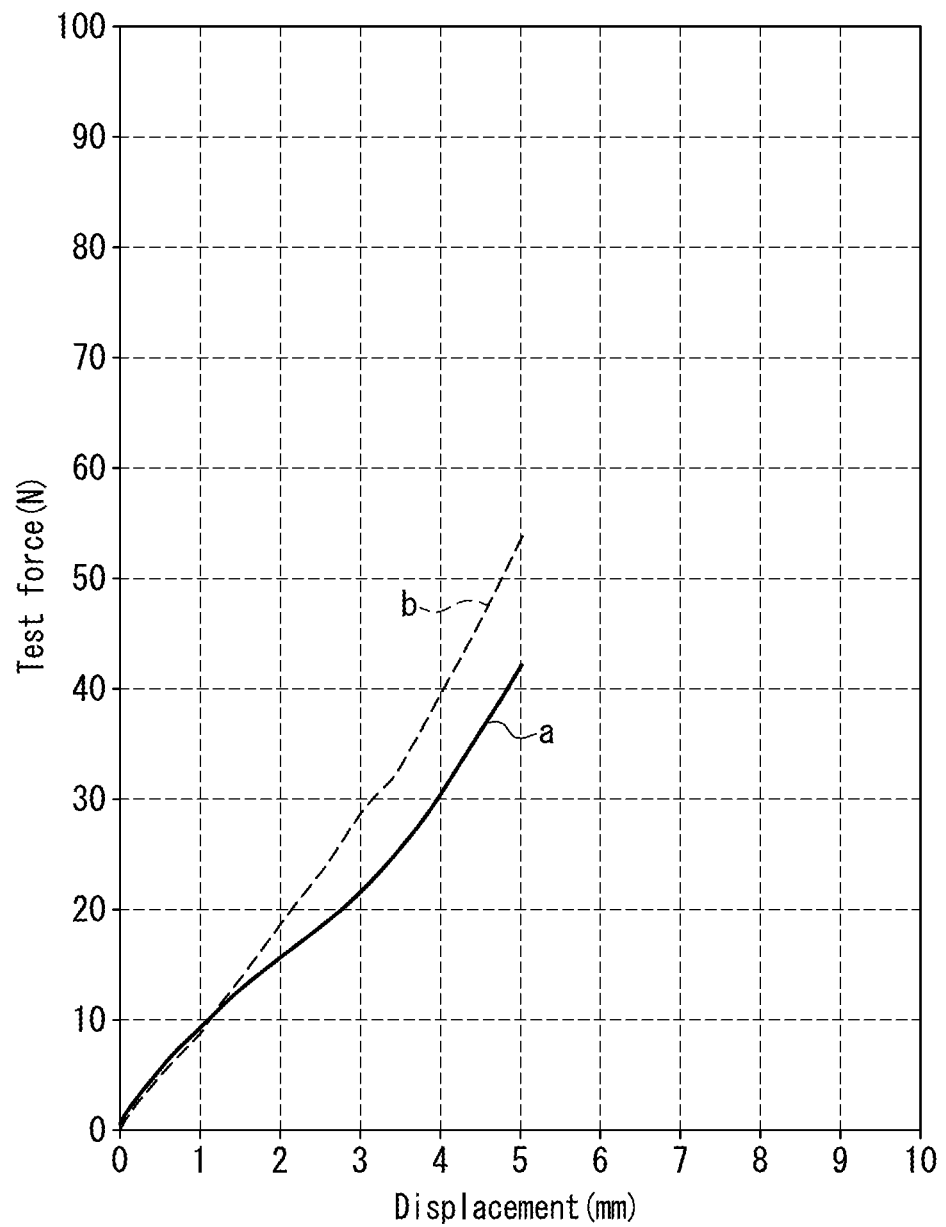
FIG. 8 is a test force-displacement measurement graph of an end portion and a central portion of a fiber reinforced resin hollow molded body of Example 1.
Figure 9:
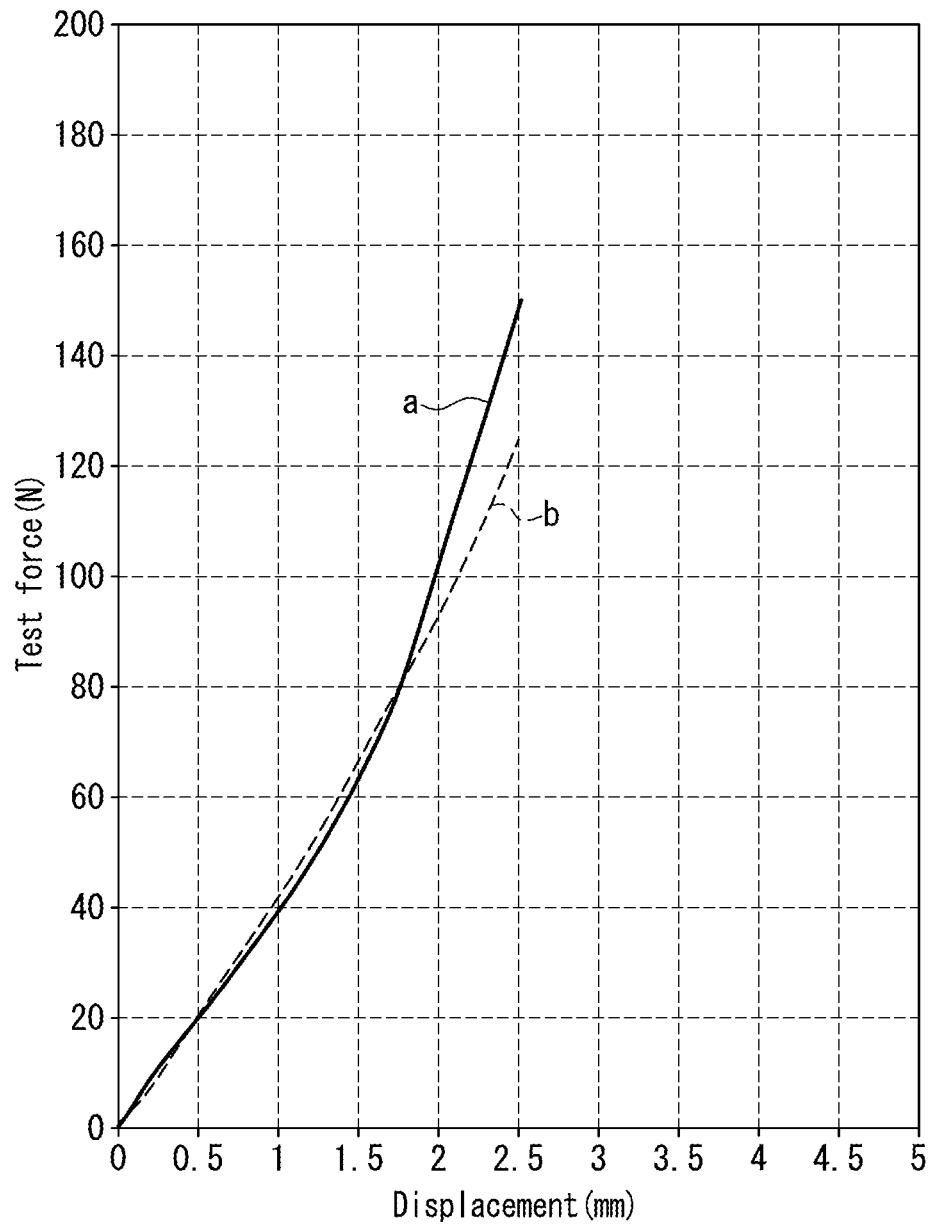
FIG. 9 is a test force-displacement measurement graph of an end portion and a central portion of a fiber reinforced resin hollow molded body of Example 2.

The hollow molded body of each of Examples 1 and 2 was subjected to compression testing in its diameter direction. Autograph (product number: AG-50kNXplus) manufactured by Shimadzu Corporation was used to perform compression testing by pressing a disk with a diameter of φ 50 mm against the hollow molded body (an end portion and a central portion thereof). In Example 1, the hollow molded body was compressed by a stroke of 2.5 mm and a stroke of 5.0 mm. In Example 2, the hollow molded body was compressed by a stroke of 2.5 mm. However, the hollow molded body of each of Examples 1 and 2 was neither destroyed nor deformed. Table 2 indicates and FIGS. 8-9 illustrate the results of the compression testing. FIG. 8 is a test force-displacement measurement graph of the end portion and the central portion of the hollow molded body of Example 1. FIG. 9 is a test force-displacement measurement graph of the end portion and the central portion of the hollow molded body of Example 2. In FIGS. 8-9, "a" indicates the measurement result of the end portion of the hollow molded body, and "b" indicates the measurement result of the central portion of the hollow molded body.

TABLE 2

| Table 2 | Measured portion | Maximum point test force (N) | Maximum point stroke (mm) | Test force when stroke was 2.5 mm (N) | Test force when stroke was 5 mm (N) |
|---|---|---|---|---|---|
| Example 1 | End portion (a) | 42.1 | 5.01 | 18.4 | 41.9 |
| | Central portion (b) | 53.8 | 5.03 | 23.3 | 53.4 |
| Example 2 | End portion (a) | 149.7 | 2.51 | 148.4 | |
| | Central portion (b) | 124.7 | 2.50 | 124.7 | |

As above, it was found that the hollow molded body of each of Examples 1 and 2 had sufficient properties for practical use.

INDUSTRIAL APPLICABILITY

The hollow molded body of the present invention can be, e.g., a pipe, a shaft, and a frame and have, e.g., a circular hollow or a quadrangular hollow in cross section. Other molded bodies having various hollows in cross section are also possible. The present invention can be widely used in general industrial applications including building members, sports goods, windmills, bicycles, automobiles, railroad vehicles, ships, aircraft, and spacecraft, for example.

The invention claimed is:

1. A method for manufacturing a fiber reinforced resin hollow molded body,
   wherein, in the manufacturing of the fiber reinforced resin hollow molded body, a resin-integrated fiber sheet is used,
   the resin-integrated fiber sheet comprises:
   a fiber sheet comprising unidirectional continuous fibers that are spread fibers of a continuous fiber group and arrayed unidirectionally in parallel; and
   thermoplastic resin that is present at least on part of a surface of the fiber sheet comprising the unidirectional continuous fibers, and
   the resin-integrated fiber sheet is a semipreg in which the thermoplastic resin in a powder form that serves as a matrix of the fiber reinforced resin hollow molded body adheres to the surface of the fiber sheet comprising the unidirectional continuous fibers through thermal fusion,
   the method comprising:
   winding a stack of a plurality of the resin-integrated fiber sheets around a surface of an elastic body to produce a wound body having an overlapping portion, the stack including the resin-integrated fiber sheet being oriented with its unidirectional continuous fibers at 0° with respect to a length direction of the elastic body;
   placing the elastic body wound with the stack of the plurality of the resin-integrated fiber sheets in a heated mold having a hollow shape; and
   performing pressure molding by supplying pressure fluid into the elastic body and melting the thermoplastic resin to impregnate the thermoplastic resin in the entire fiber sheets comprising the unidirectional continuous fibers in order to consolidate the wound resin-integrated fiber sheets.

2. The method according to claim 1, wherein the plurality of the resin-integrated fiber sheets are stacked and wound such that fiber directions of the unidirectional continuous fibers of the plurality of the resin-integrated fiber sheets are different.

3. The method according to claim 1, wherein in the semipreg, the thermoplastic resin is not impregnated in the fiber sheet comprising the unidirectional continuous fibers or is only partially impregnated in the fiber sheet comprising the unidirectional continuous fibers.

4. The method according to claim 1,
   wherein the resin-integrated fiber sheet used for manufacturing the fiber reinforced resin hollow molded body comprises bridging fibers that lie in directions crossing the unidirectional continuous fibers,
   the thermoplastic resin unifies the unidirectional continuous fibers with the bridging fibers, and
   the bridging fibers are dropped on the fiber sheet comprising the unidirectional continuous fibers or generated by applying tension to the unidirectional continuous fibers during or after spreading of the continuous fiber group, and include bridging fibers that are present on the surface of the fiber sheet comprising the unidirectional continuous fibers and bridging fibers that are in a state of crossing the unidirectional continuous fibers.

5. The method according to claim 4, wherein the resin-integrated fiber sheet comprises the unidirectional continuous fibers in an amount of 75 to 99% by mass and the bridging fibers in an amount of 1 to 25% by mass based on 100% by mass of a total of the unidirectional continuous fibers and the bridging fibers.

6. The method according to claim 1, wherein the resin-integrated fiber sheet has a thickness of 0.01 to 5.0 mm.

7. The method according to claim 1, further comprising:
   lapping the plurality of the resin-integrated fiber sheets on each other;
   cutting a portion in which the plurality of the resin-integrated fiber sheets are lapped on each other out of the plurality of the resin-integrated fiber sheets; and
   winding the portion to produce the wound body having the overlapping portion.

* * * * *